United States Patent
Tao et al.

(10) Patent No.: US 12,522,332 B2
(45) Date of Patent: Jan. 13, 2026

(54) CHARGING CONTROL METHOD AND SYSTEM FOR MARINE PROPULSION DEVICE, AND MARINE PROPULSION DEVICE

(71) Applicant: Guangdong ePropulsion Technology Limited, Guangdong (CN)

(72) Inventors: Shizheng Tao, Guangdong (CN); Wei Yang, Guangdong (CN); Xiaokang Wan, Guangdong (CN); Zongliang Pan, Guangdong (CN)

(73) Assignee: Guangdong ePropulsion Technology Limited, Guangdong (CN)

( * ) Notice: Subject to any disclaimer, the term of this patent is extended or adjusted under 35 U.S.C. 154(b) by 422 days.

(21) Appl. No.: 18/446,494

(22) Filed: Aug. 9, 2023

(65) Prior Publication Data
US 2023/0382506 A1 Nov. 30, 2023

Related U.S. Application Data

(63) Continuation of application No. PCT/CN2021/136163, filed on Dec. 7, 2021.

(30) Foreign Application Priority Data

Feb. 9, 2021 (CN) .......................... 202110179570.1

(51) Int. Cl.
*B63H 3/10* (2006.01)
*B63H 9/04* (2020.01)
(Continued)

(52) U.S. Cl.
CPC ................. *B63H 3/10* (2013.01); *B63H 9/04* (2013.01); *B63H 2021/202* (2013.01); *B63J 2003/046* (2013.01)

(58) Field of Classification Search
CPC ...... B63H 3/10; B63H 9/04; B63H 2021/203; B63H 2003/046
See application file for complete search history.

(56) References Cited

U.S. PATENT DOCUMENTS 7,482,767 B2 * 1/2009 Tether .................... B63H 21/20
　　　　　　　　　　　　　　　318/154
8,690,616 B2 * 4/2014 Grassi .................. B63H 5/1252
　　　　　　　　　　　　　　　440/3
(Continued)

FOREIGN PATENT DOCUMENTS

CN　　H05161372　　6/1993
CN　　104819098　　8/2015
(Continued)

OTHER PUBLICATIONS

N. Bennabi et al., "Evaluation of Recovery Braking Capacities on Electric Vessel", 2018 XIII International Conference on Electrical Machines (ICEM), Sep. 3, 2018, pp. 2535-2541.
(Continued)

*Primary Examiner* — S. Joseph Morano
*Assistant Examiner* — Jovon E Hayes
(74) *Attorney, Agent, or Firm* — JCIPRNET

(57) ABSTRACT

The present disclosure relates to a charging control method and system for a marine propulsion device, and a marine propulsion device. The method includes: acquiring a rotational speed and a regeneration charging power of a motor during a sailing process of a vessel; adjusting the rotational speed to obtain the regeneration charging power corresponding to the adjusted rotational speed, and searching for a power extreme point of the regeneration charging power relative to the rotational speed based on a regeneration charging power varying process; maintaining the rotational
(Continued)

speed corresponding to the power extreme point to realize regeneration charging of a battery.

17 Claims, 7 Drawing Sheets

(51) Int. Cl.
*B63H 21/20* (2006.01)
*B63J 3/04* (2006.01)

(56) References Cited

U.S. PATENT DOCUMENTS

| | | | | |
|---|---|---|---|---|
| 2006/0175996 | A1* | 8/2006 | Tether | B60L 7/10 |
| | | | | 318/376 |
| 2010/0274420 | A1* | 10/2010 | Veit | B63H 3/10 |
| | | | | 440/75 |
| 2012/0028514 | A1* | 2/2012 | Grassi | B63H 5/1252 |
| | | | | 440/3 |
| 2013/0115832 | A1* | 5/2013 | Suzuki | B63H 21/20 |
| | | | | 440/6 |
| 2015/0075167 | A1* | 3/2015 | Caouette | B63H 21/22 |
| | | | | 60/706 |
| 2018/0134162 | A1* | 5/2018 | Biebach | B63H 21/21 |
| 2022/0119084 | A1* | 4/2022 | Miyagi | B60L 50/60 |

FOREIGN PATENT DOCUMENTS

| | | | | |
|---|---|---|---|---|
| CN | 105620706 | | 6/2016 | |
| CN | 105843321 | | 8/2016 | |
| CN | 107503884 | | 12/2017 | |
| CN | 108069011 | | 5/2018 | |
| CN | 108069011 A * | | 5/2018 | ............. B63H 21/21 |
| CN | 110015154 | | 7/2019 | |
| CN | 110341494 | | 10/2019 | |
| CN | 111064418 | | 4/2020 | |
| CN | 111143985 | | 5/2020 | |
| CN | 111762150 | | 10/2020 | |
| CN | 112968511 | | 6/2021 | |
| CN | 112968511 A * | | 6/2021 | ............. B63H 21/17 |
| EP | 4011683 A2 * | | 6/2022 | ............. B60L 58/12 |
| GB | 2463147 A * | | 8/2010 | ................ H02J 7/14 |
| JP | 2004257294 A * | | 9/2004 | ........... B63H 21/213 |
| SE | 523993 C2 * | | 6/2004 | ................ B63J 3/04 |
| WO | WO-2005075234 A2 * | | 8/2005 | ............. B63H 21/20 |
| WO | 2016135336 | | 9/2016 | |
| WO | 2018133807 | | 7/2018 | |
| WO | WO-2022170832 A1 * | | 8/2022 | ............ H02J 7/1415 |

OTHER PUBLICATIONS

"Search Report of Europe Counterpart Application", issued on Jun. 27, 2024, p. 1-p. 10.

Shi Yan et al., "Application of Lithium Battery in Braking Energy Recovery of Hybrid Power Ship", China Water Transport, vol. 14, Issue 11, Nov. 2014, with English abstract, pp. 1-4.

"International Search Report (Form PCT/ISA/210) of PCT/CN2021/136163", mailed on Mar. 4, 2022, with English translation thereof, pp. 1-5.

"Written Opinion of the International Searching Authority (Form PCT/ISA/237) of PCT/CN2021/136163", mailed on Mar. 4, 2022, with English translation thereof, pp. 1-6.

* cited by examiner

CHARGING CONTROL METHOD AND SYSTEM FOR MARINE PROPULSION DEVICE, AND MARINE PROPULSION DEVICE

CROSS-REFERENCE TO RELATED APPLICATION

This application is a continuation of international PCT application serial no. PCT/CN2021/136163, filed on Dec. 7, 2021, which claims the priority benefit of China application no. 202110179570.1, filed on Feb. 9, 2021. The entirety of each of the above-mentioned patent applications is hereby incorporated by reference herein and made a part of this specification.

BACKGROUND OF THE INVENTION

Technical Field

The present disclosure relates to the technical field of marine vessels, and in particular, to a charging control method and system for a marine propulsion device, and a marine propulsion device.

Description of Related Art

Motor regeneration charging technology is usually used in the field of electric vehicles. When a motor is input with mechanical energy, such as being dragged to rotate, the motor will convert the mechanical energy into electric energy for output, and a motor winding will cut a magnetic field to generate electromotive force and form a current through short-circuit of an output-stage bridge arm. When the output-stage bridge arm is modulated by "pulse width modulation (PWM)", since an induced current cannot leap, a cut-off current loop will inevitably generate induced high voltage to maintain a current path, that is, generate a regeneration electromotive force and output electric energy.

In the field of marine vessels, a marine propulsion device usually uses propellers and motors to drive a ship. When a propeller is washed by water to rotate reversely, a motor will generate regeneration electromotive force, and a controller will control recovery of the regeneration electromotive force to form a current, so as to charge an energy accumulator on the ship or supply power to other marine electronic devices.

In related arts, when the regeneration charging technology is adopted, a sensor is used to determine a relative flow velocity between a driving equipment and water, so as to determine a maximum power point for regeneration charging, which has a complicated structure and high cost.

SUMMARY OF THE INVENTION

Embodiments of the present disclosure provide a charging control method and system for a marine propulsion device, and a marine propulsion device.

In a first aspect, the present disclosure provides a charging control method for a marine propulsion device, including:
acquiring a regeneration charging power and a rotational speed of a motor of the marine propulsion device during a sailing process of a vessel;
adjusting the rotational speed one or more times, and after each time of rotational speed adjustment, acquiring the regeneration charging power corresponding to the adjusted rotational speed, and searching for a power extreme point based on a regeneration charging power varying process;
maintaining a rotational speed corresponding to the power extreme point to realize regeneration charging of a battery coupled to the marine propulsion device.

In some embodiments, acquiring the rotational speed of the motor of the marine propulsion device includes:
acquiring a regeneration electromotive force and/or an angular speed of the motor;
determining the rotational speed of the motor based on a conversion relation between the regeneration electromotive force and the rotational speed, and/or a conversion relation between the angular speed and the rotational speed.

In some embodiments, adjusting the rotational speed one or more times, and after each time of rotational speed adjustment, acquiring the regeneration charging power corresponding to the adjusted rotational speed, and searching for the power extreme point based on the regeneration charging power varying process includes:
one or more times of searching process, where for each time of the searching process:
acquiring an initial rotational speed and a regeneration charging power corresponding to the initial rotational speed, where in a first time of the searching process, the initial rotational speed is the acquired rotational speed, the regeneration charging power corresponding to the initial rotational speed is the acquired regeneration charging power;
reducing the initial rotational speed by directly or indirectly adjusting a current or a torque of the motor, and acquiring a regeneration charging power corresponding to a reduced rotational speed;
comparing the regeneration charging power corresponding to the initial rotational speed and the regeneration charging power corresponding to the reduced rotational speed;
when the regeneration charging power corresponding to the initial rotational speed is greater than the regeneration charging power corresponding to the reduced rotational speed, determining the regeneration charging power corresponding to the initial rotational speed as the power extreme point;
when the regeneration charging power corresponding to the initial rotational speed is not greater than the regeneration charging power corresponding to the reduced rotational speed, assigning the reduced rotational speed as an initial rotational speed in a next time of the searching process, and assigning the regeneration charging power corresponding to the reduced rotational speed as a regeneration charging power corresponding to the initial rotational speed in the next time of the searching process.

In some embodiments, adjusting the rotational speed one or more times, and after each time of rotational speed adjustment, acquiring the regeneration charging power corresponding to the adjusted rotational speed, and searching for the power extreme point based on the regeneration charging power varying process includes:
one or more times of searching process, where for each time of the searching process:
acquiring an initial rotational speed and a regeneration charging power corresponding to the initial rotational speed, where in a first time of the searching process, the initial rotational speed is the acquired rotational speed, the regeneration charging power corresponding to the initial rotational speed is the acquired regeneration charging power;

reducing the initial rotational speed by directly or indirectly adjusting a current or a torque of the motor, and acquiring a regeneration charging power corresponding to a first-time-reduced rotational speed;

determining a first difference by subtracting the regeneration charging power corresponding to the initial rotational speed from the regeneration charging power corresponding to the first-time-reduced rotational speed;

reducing the first-time-reduced rotational speed by directly or indirectly adjusting a current or a torque of the motor, and acquiring a regeneration charging power corresponding to a second-time-reduced rotational speed;

determining a second difference by subtracting the regeneration charging power corresponding to the first-time-reduced rotational speed from the regeneration charging power corresponding to the second-time-reduced rotational speed;

when the first difference is not greater than 0, determining the regeneration charging power corresponding to the initial rotational speed as the power extreme point;

when the first difference is greater than 0, and the second difference is smaller than 0, determining the regeneration charging power corresponding to the first-time-reduced rotational speed as the power extreme point;

when the first difference is greater than 0, and the second difference is not smaller than 0, assigning the second-time-reduced rotational speed as an initial rotational speed in a next time of the searching process, and assigning the regeneration charging power corresponding to the second-time-reduced rotational speed as a regeneration charging power corresponding to the initial rotational speed in the next time of the searching process.

In some embodiments, reducing the initial rotational speed includes: subtracting a preset rotational speed variation from the initial rotational speed.

In some embodiments, before maintaining the rotational speed corresponding to the power extreme point to realize regeneration charging of the battery coupled to the marine propulsion device, the method includes:

determining whether the rotational speed is greater than a preset value, and when it is determined that the rotational speed is greater than the preset value, starting a regeneration charging function; or, determining whether a throttle value output by a controller of the marine propulsion device is 0, and when the throttle value is 0, starting a regeneration charging function.

In some embodiments, the method further includes:

when detecting that at least one of a sailing speed variation, a rotational speed variation or a torque variation exceeds a theoretical threshold, re-determining the power extreme point.

In some embodiments, re-determining the power extreme point when the torque variation exceeds the theoretical threshold includes:

determining a corresponding relation between a theoretical rotational speed value and a theoretical torque value based on the power extreme point;

based on the corresponding relation, when an actual rotational speed is equal to the theoretical rotational speed value, and a difference between an actual torque value and the theoretical torque value corresponding to the theoretical rotational speed value is greater than a preset difference, re-determining the power extreme point.

In some embodiments, re-determining the power extreme point includes:

when the actual torque value is greater than the theoretical torque value, gradually increasing the rotational speed and re-searching the power extreme point;

when the actual torque value is smaller than the theoretical torque value, gradually reducing the rotational speed and re-searching the power extreme point.

In some embodiments, gradually increasing the rotational speed and re-searching the power extreme point includes:

one or more times of searching process, where for each time of the searching process:

acquiring an initial rotational speed and a regeneration charging power corresponding to the initial rotational speed, where for a first time of the searching process, the initial rotational speed is a rotational speed corresponding to a current power extreme point, and the regeneration charging power corresponding to the initial rotational speed is the current power extreme point;

increasing the initial rotational speed according to a preset rotational speed variation by directly or indirectly adjusting a current or a torque of the motor, and acquiring a regeneration charging power corresponding to an increased rotational speed;

comparing the regeneration charging power corresponding to the initial rotational speed and the regeneration charging power corresponding to the increased rotational speed;

when the regeneration charging power corresponding to the initial rotational speed is greater than the regeneration charging power corresponding to the increased rotational speed, determining the regeneration charging power corresponding to the initial rotational speed as the power extreme point;

when the regeneration charging power corresponding to the initial rotational speed is not greater than the regeneration charging power corresponding to the increased rotational speed, assigning the increased rotational speed as an initial rotational speed in a next time of the searching process, and assigning the regeneration charging power corresponding to the increased rotational speed as a regeneration charging power corresponding to the initial rotational speed in the next time of the searching process;

gradually reducing the rotational speed and re-searching the power extreme point includes:

one or more times of searching process, where for each time of the searching process:

acquiring an initial rotational speed and a regeneration charging power corresponding to the initial rotational speed, where for a first time of the searching process, the initial rotational speed is a rotational speed corresponding to a current power extreme point, and the regeneration charging power corresponding to the initial rotational speed is the current power extreme point;

reducing the initial rotational speed according to a preset rotational speed variation by directly or indirectly adjusting a current or a torque of the motor, and acquiring a regeneration charging power corresponding to a reduced rotational speed;

comparing the regeneration charging power corresponding to the initial rotational speed and the regeneration charging power corresponding to the reduced rotational speed;

when the regeneration charging power corresponding to the initial rotational speed is greater than the regeneration charging power corresponding to the reduced rotational speed, determining the regeneration charging power corresponding to the initial rotational speed as the power extreme point;

when the regeneration charging power corresponding to the initial rotational speed is not greater than the regeneration charging power corresponding to the reduced rotational speed, assigning the reduced rotational speed as an initial rotational speed in a next time of the searching process, and assigning the regeneration charging power corresponding to the reduced rotational speed as a regeneration charging power corresponding to the initial rotational speed in the next time of the searching process.

In some embodiments, the preset difference is smaller than or equal to 50% of the theoretical torque value.

In a second aspect, the present disclosure further provides a charging control system for a marine propulsion device, including a propeller, a motor, a controller, where the controller is configured to:

acquire a regeneration charging power of a motor and a rotational speed of the motor during a sailing process of a vessel;

adjust the rotational speed one or more times, acquire the regeneration charging power corresponding to an adjusted rotational speed, and search for the power extreme point;

maintain a rotational speed corresponding to the power extreme point to realize regeneration charging of a battery coupled to the charging control system for the marine propulsion device.

In some embodiments, the system further includes:

an over-current protector, configured to release at least part of energy during a regeneration charging process, so as to restrict a bus current.

In some embodiments, the over-current protector includes a current limiting device and a resistor;

an end of the current limiting device is connected to an end of a motor driving circuit and an end of a capacitor, and is grounded;

another end of the current limiting device is connected to an end of the resistor, and another end of the resistor is connected to another end of the motor driving circuit and another end of the capacitor and is connected to a power end.

In a third aspect, the present disclosure further provides a marine propulsion device, including a propeller, a motor and a controller, where the controller performs the method according to any one of the first aspect, and the marine propulsion device includes or is externally connected with an energy accumulator.

In some embodiments, the propeller includes a foldable propeller.

In a fourth aspect, the present disclosure further provides a computer storage medium, where the computer storage medium can store a program, and when the program is executed, part of or all steps in respective implementations of the charging control method for the marine propulsion device provided in the first aspect of the present disclosure can be implemented.

It is to be understood that both the above general description and the following detailed description are exemplary and illustrative only and cannot restrict the present disclosure.

BRIEF DESCRIPTION OF DRAWINGS

The accompanying drawings are incorporated in and constitute a part of the present specification. The accompanying drawings illustrate embodiments consistent with the present disclosure, and together with the description, serve to illustrate principles of the present disclosure.

In order to illustrate the technical solution in the embodiments of the present disclosure or related technology more clearly, the drawings needed in the description of the embodiments or related technology will be briefly introduced below. Obviously, for those of ordinary skills in the art, other drawings can be obtained according to these drawings without making creative efforts.

DESCRIPTION OF THE EMBODIMENTS

In order to make the purpose, technical solution and advantages of the embodiments of the present disclosure clearer, the technical solution in the embodiments of the present disclosure will be described clearly and completely below. Obviously, the described embodiments are a part of the embodiments of the present disclosure, but not all the embodiments. Based on the embodiments in the present disclosure, all other embodiments obtained by those of ordinary skills in the art without making creative efforts belong to the protection scope of the present disclosure.

According to a charging control method of a marine propulsion device provided by the embodiment of the present disclosure, a propeller can be washed by water flow to realize conversion from kinetic energy to electric energy, so as to supply power to batteries or other marine loads. At the same time, a power extreme point can be searched and adjusted by adjusting a rotational speed of a motor and detecting a corresponding regeneration charging power change, so that the battery can be charged at maximum efficiency without setting various sensors to acquire relevant parameters, so that the manufacturing cost is reduced and the productization is simplified.

The rotational speed of the motor is exactly the same as a rotational speed of a propeller; or the rotational speed of the motor and the rotational speed of the propeller change linearly and are related by a proportional coefficient. Therefore, the rotational speed of the propeller can be replaced with the rotational speed of the motor to represent relations among the rotational speed, the regeneration charging power and the sailing speed. A value of charging efficiency and a value of a charging power are in a positive correlation. When a battery is charged at a power extreme point, the battery is at an optimal charging efficiency, that is, the battery is charged at maximum efficiency.

With reference to FIGS. 1-10, a charging control method and system for a marine propulsion device, and a marine propulsion device provided by embodiments of the present disclosure will be illustratively described.

For example, the marine propulsion device may include water propulsion devices such as an outboard engine (an outside engine), an inboard engine (an inside engine), a paddle hanger, a towing motor, and a pod propeller, etc., which will not be limited here.

Figure 1:
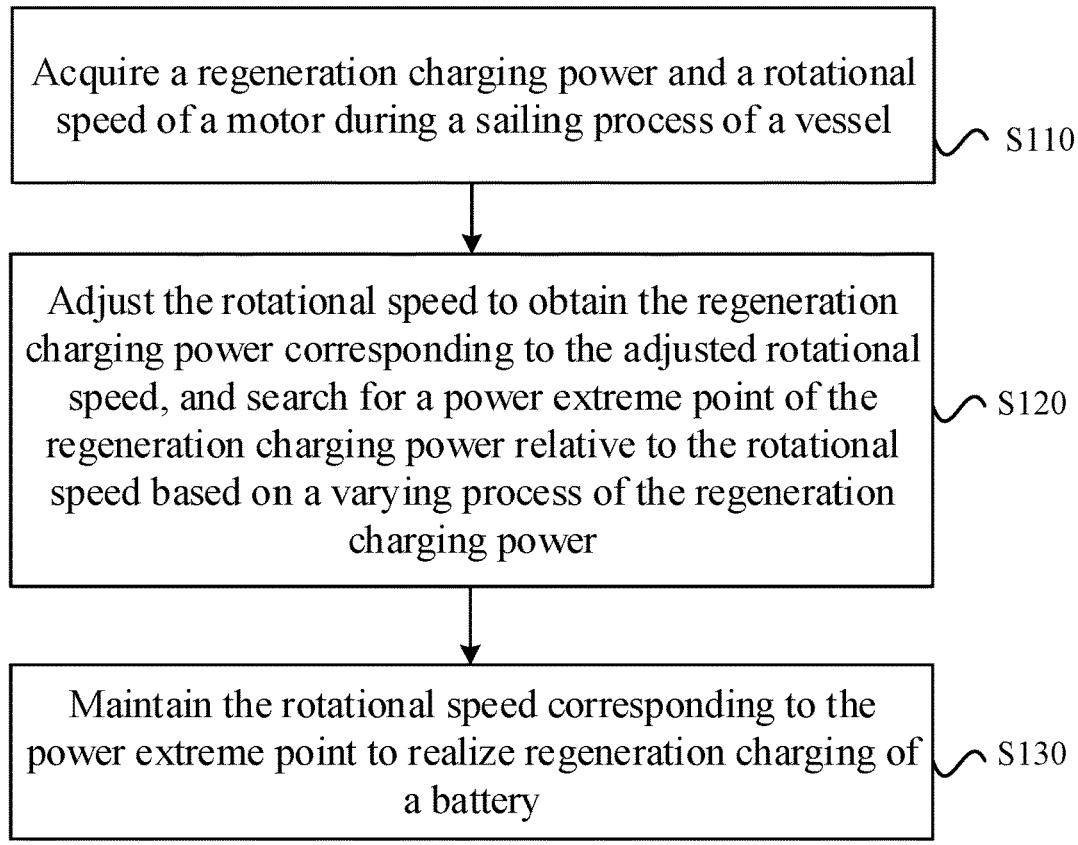
FIG. 1 is a schematic flowchart of a charging control method for a marine propulsion device provided by an embodiment of the present disclosure.

Illustratively, FIG. 1 is a schematic flowchart of a charging control method for a marine propulsion device provided by an embodiment of the present disclosure. Referring to FIG. 1, the method may include:

In step S110, during a sailing process of a vessel, a rotational speed of a motor and a corresponding regeneration charging power are acquired.

The marine propulsion device includes a battery, the motor and a propeller, where the battery is used for supplying power. When the propeller of the marine propulsion device is rotated by external force or torque, the propeller will drive the motor to generate electricity, thus charging the battery. At this time, a charging power output by the motor to the battery is the regeneration charging power.

The regeneration charging power may be a charging power of the battery in a regeneration charging state, and may be a power output from the motor to the battery, where the regeneration charging power is positively correlated with both an absorbing power of the motor and an output power of a controller. The absorbing power of the motor is a power that water current pushes the propeller to drive the motor to rotate, that is, an input power of the motor. There is power loss when the motor outputs power to the battery, so the regeneration charging power and the absorbing power of the motor can be related by a proportional coefficient.

For example, the regeneration charging power can be obtained by detecting a voltage and a current of a bus and calculating a product thereof, and the regeneration charging power is further transmitted to a parameter-acquiring module.

The rotational speed of the motor may be equal to or used to represent the rotational speed of the propeller, which can be monitored based on a motor state observer, and can be transmitted to the parameter-acquiring module.

In other embodiments, the rotational speed and the regeneration charging power can also be obtained in other ways known to those skilled in the art, which is not limited by the embodiments of the present disclosure.

In step S120, the rotational speed is adjusted to obtain the regeneration charging power corresponding to the adjusted rotational speed, and a power extreme point of the regeneration charging power relative to the rotational speed is searched for based on a regeneration charging power varying process.

The principle of regeneration charging is as follows: when a vessel is sailing, the propeller is driven to rotate by water current, and the rotation of the propeller drives the motor to rotate, and the motor generates regeneration electromotive force (or "induced electromotive force") in a rotating state. By controlling a circuit, a controller can control a current corresponding to the regeneration electromotive force, that is, control the regeneration electromotive force generated by the motor to form a reverse current, and recover the reverse current to charge the battery.

The regeneration charging process satisfies a voltage balance equation as follows:

$$Ua=Ra \times Ia+La \times dIa/dt+Ea \qquad \text{Equation (1)}$$

In the equation, Ua represents a phase voltage output by the controller, Ra, Ia and La represent resistance, current and inductance of phase A respectively, and Ea represents the regeneration electromotive force generated in phase A. From the above equation, when Ua<Ea, Ia is negative, and a negative current can be generated by adjusting Ua output by the controller.

In a sailing process (that is, a traveling process) of a hull (that is, the vessel), there is a certain correlation among the sailing speed, the rotational speed and the absorbing power of the motor, as shown in the following equation:

$$P=2\pi\rho D^5 n^3 \times [-K_1 V^5/(n^5 D^5)+K_2 V^4/(n^4 D^4)-K_3 V^3/(n^3 D^3)+K_4 V^2/(n^2 D^2)-K_5 V(Nd)\alpha K_6] \qquad \text{Equation (2)}$$

In the equation, P represents the absorbing power of the motor, $\rho$ represents a density of water, D represents a diameter of the propeller, N represents the rotational speed of the propeller, where the rotational speed of the propeller may be equal to the rotational speed w of the motor, V represents the sailing speed, and $K_1$-$K_6$ represent parameters related to other geometric characteristics of the propeller rather than the diameter, such as a pitch and a number of blades, etc., which are variable.

The above equations (1) and (2) are applicable to permanent magnet synchronous motors and brushless direct current motors. In other embodiments, when applied to other types of motors, other equations can be adopted to determine the absorbing power of the motor, which will not be described or limited herein.

Figure 2:
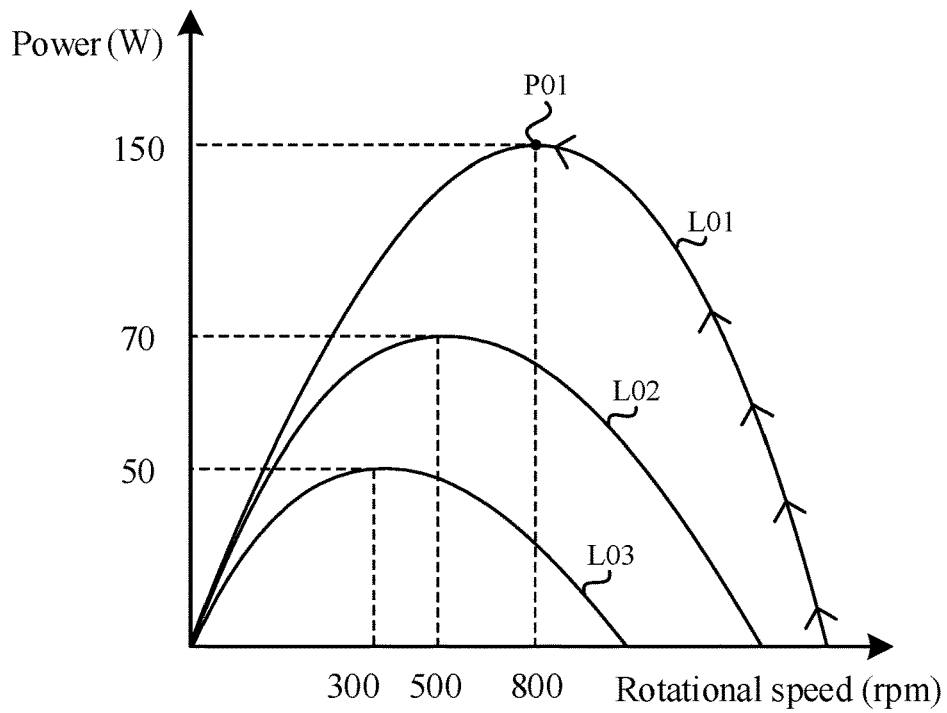
FIG. 2 is a schematic association diagram among a sailing speed, a rotational speed and a regeneration charging power provided by an embodiment of the present disclosure.

According to the positive correlation between the absorbing power and regeneration charging power of the motor, relations among sailing speed, rotational speed and absorbing power (or regeneration charging power) of the motor can be obtained as shown in FIG. 2. An abscissa represents the rotational speed in rpm; an ordinate represents the absorbing power (or regeneration charging power) of the motor in W; L01, L02 and L03 respectively represent varying curves at different sailing speeds, and the sailing speeds increase in sequence; illustratively, corresponding sailing speeds of L01, L02 and L03 are 5 km/h, 15 km/h and 35 km/h, respectively. Referring to FIG. 2, at different sailing speeds, curves of the rotational speed and the absorbing power are similar to parabola, and each curve has an extreme point of motor absorbing power, that is, the power extreme point, or power maximum point. In FIG. 2, P01 shows the power extreme point of curve L01.

From this, it is known that in a process of adjusting the rotational speed, the regeneration charging power varies relative to the rotational speed, and an extreme point is presented, which is the power extreme point. From this, according to the relation between the rotational speed and the regeneration charging power, the power extreme point of the regeneration charging power relative to the rotational speed can be searched and determined in the process of adjusting the rotational speed. Specifically, at any sailing speed, starting from a no-load rotational speed of the motor, by adjusting the rotational speed of the propeller, that is, by adjusting the rotational speed of the motor, the extreme point of the regeneration charging power can always be determined. Based on FIG. 2, by adjusting the rotational speed of the propeller, the maximum point of the regeneration charging power at any sailing speed is searched, so as to constantly maintain the rotational speed during sailing of the vessel as the maximum point of regeneration charging power for regeneration charging, thereby improving charging efficiency. The searching process will be illustratively described in the following with reference to FIG. 4.

It is to be noted that, FIG. 2 only illustratively shows power varying curves relative to the rotational speed at three different sailing speeds, which is only used to illustrate the relation between the sailing speed, the rotational speed and the regeneration charging power, and does not constitute a limitation to the embodiments of the present disclosure.

In step S130, the rotational speed corresponding to the power extreme point is maintained to realize regeneration charging of a battery.

Specifically, through searching in step S120, the power extreme point is found, then the rotational speed corresponding to the power extreme point is maintained, and a switch device of a controller is opened to realize regeneration charging of the battery.

The adjustment and maintenance of the rotational speed can be realized based on adjustment and maintenance of current or torque, which is not described in detail or limited here.

In some embodiments, based on FIG. 1, the rotational speed is acquired in step S110 may include:
a regeneration electromotive force and/or an angular speed of the motor is acquired;
the rotational speed is determined based on a conversion relation between the regeneration electromotive force and the rotational speed, and/or a conversion relation between the angular speed and the rotational speed.

Specifically, the conversion relation between the regeneration electromotive force and the rotational speed may be represented in the following equation:

$$e = Ke \times w$$

where e represents the regeneration electromotive force, Ke represents a coefficient of the regeneration electromotive force, and w represents the rotational speed. From this, the rotational speed can be calculated by acquiring the regeneration electromotive force.

The conversion relation between the angular speed and the rotational speed may be represented in the following equation:

$$n = w \times pn/60$$

where n represents the angular speed, w represents the rotational speed, pn represents a number of pole pairs of the motor, which is a constant. From this, the rotational speed can be calculated by acquiring the angular speed.

Based on this, the regeneration electromotive force and the angular speed of the motor can be acquired through a motor state observer. When the motor is in a sliding state, the motor rotational speed can be acquired through the regeneration electromotive force of the motor; when the motor is in a driven state, the motor rotational speed can be obtained through the angular speed.

In other embodiments, the motor state observer can also be used to obtain other state parameters of the motor, such as rotational speed, magnetic linkage, angle, moment, torque and other parameters, which are not limited here.

In some embodiments, based on FIG. 1, step S120 may include:
the rotational speed is reduced by increasing the torque opposite to a direction of water flow, and when a feedback rotational speed is equal to a given rotational speed, the regeneration charging power at this rotational speed is acquired;
a difference of the regeneration charging power is determined based on previous and subsequent regeneration charging powers;
for two adjacent differences of the regeneration charging power, when a previous difference of the regeneration charging power is greater than 0, and a subsequent difference of the regeneration charging power is smaller than 0, a middle regeneration charging power is determined as the power extreme point.

Specifically, when the motor is in a free state, a no-load rotational speed of the motor can be acquired; after acquiring the no-load rotational speed of the motor, it is determined whether the no-load rotational speed is greater than a preset value, and if the no-load rotational speed is greater than the preset value, a switch device connected with a battery circuit is turned on, and a regeneration charging function is started, and the rotational speed of the propeller is reduced through a controlling module, so that the motor torque will increase, that is, it is realized by gradually increasing the torque opposite to the water flow direction. Every time the rotational speed is reduced, the regeneration charging power is detected, and the extreme point of the motor regeneration charging power is searched by comparing the previous and subsequent regeneration charging powers, as shown in an arrow direction on curve L01 in FIG. 2.

Illustratively, variation of the torque is determined based on a current Iq of q-axis and a current Id of d-axis, and the current Iq of q-axis is determined based on variation of three-phase current. Specifically:

$$Te = (3/2) \times pn \times Iq \times [Id \times (Ld - Lq) + \psi f]$$

which can be simplified as:

$$Te = (3/2) \times pn \times Iq \times \psi f;$$

and $$-Iq = (w\psi f - Uq)/R$$

$$J(dw/dt) = Te - Tl - Bw$$

Te represents an electromagnetic torque, Tl represents a load torque, Iq represents the current of q-axis, Id represents the current of d-axis, Ld represents an inductance of d-axis, Lq represents an inductance of q-axis, pn represents a number of pole pairs of the motor, ψf represents a magnetic linkage of a permanent magnet, J represents a moment of inertia, B represents a damping factor, Uq represents a voltage of q-axis, and the regeneration charging power is obtained by multiplying the current and the voltage. It should be noted that, except for some general formulas, other formulas are applicable to permanent magnet synchronous motors and brushless direct current motors.

In the process of searching the power extreme point, current adjustment corresponds to torque adjustment, and the torque adjustment corresponds to rotational speed adjustment. Each variation in the rotational speed adjustment is determined by a preset rotational speed variation, that is, a rotational speed after each time of variation is equal to a current rotational speed subtracted with the preset rotational speed variation. Illustratively, the preset rotational speed variation is set according to motor characteristics and absorbing efficiency of the propeller. In the present embodiment, based on power detection accuracy, a gradient variation of the power is usually set as 10 W. As an embodiment, the preset rotational speed variation range of rotational speed adjustment in the present application can be selected from 30-50 rpm. It should be noted that a preset variation may also be a current variation or a torque variation, and the rotational speed can be adjusted according to a detected variation of the power together with the current variation or the torque variation.

In other embodiments, the power extreme point can also be determined by directly comparing previously and subsequently acquired regeneration charging powers. Illustratively, the process may include following steps:

the rotational speed is reduced by directly or indirectly adjusting a current or a torque of the motor, and the regeneration charging power corresponding to the reduced rotational speed is acquired;

the previously and subsequently acquired regeneration charging powers are compared;

when a previous regeneration charging power is greater than a subsequent regeneration charging power, the previous regeneration charging power is determined as the power extreme point; when the previous regeneration charging power is not greater than the subsequent regeneration charging power, the subsequent regeneration charging power is assigned as a new previous regeneration charging power to repeat a searching process.

Specifically, in a process of reducing the rotational speed, the regeneration charging power presents a trend of increasing first and then decreasing. Based on this, when a corresponding regeneration charging power before adjustment of the rotational speed is smaller than a corresponding regeneration charging power after adjustment of the rotational speed, it indicates that no power extreme point has been found; at this time, the adjusted corresponding regeneration charging power is taken as a reference power (i.e. a new previous regeneration charging power), adjustment of the rotational speed and comparing of the regeneration charging power are continued. Until a corresponding regeneration charging power before adjustment of the rotational speed is greater than a corresponding regeneration charging power after adjustment of the rotational speed, it indicates that the corresponding regeneration charging power before adjustment is the power extreme point to be searched.

Therefore, based on the rotational speed adjustment and the regeneration charging power comparison, the search process of the regeneration charging power is completed.

Illustratively, comparison of the previously and subsequently acquired regeneration charging powers can be realized by ways of calculating difference or ratio; for example, the difference is compared with 0, or the ratio is compared with 1, which is not limited here.

Figure 3:
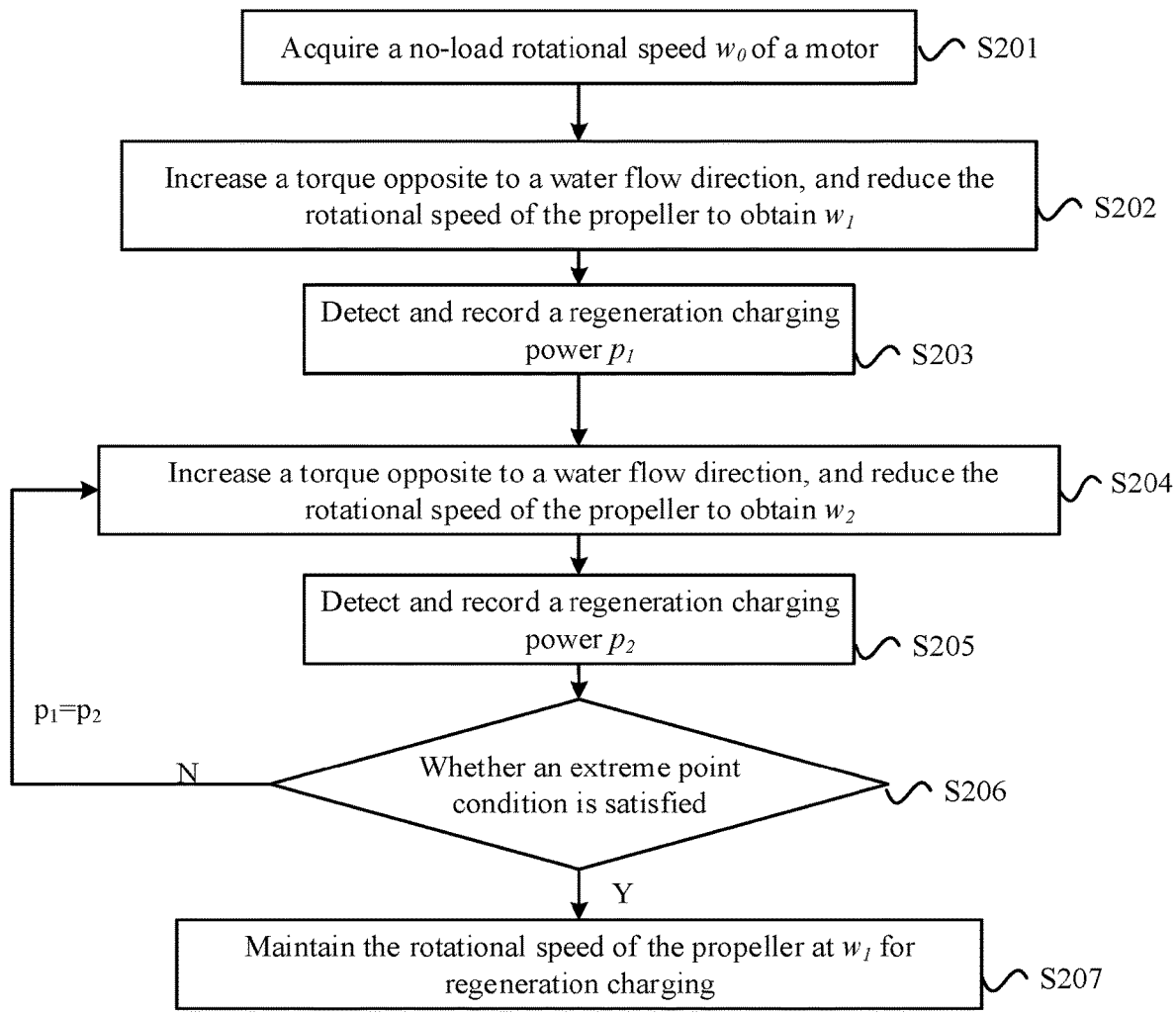
FIG. 3 is a schematic flowchart of another charging control method for a marine propulsion device provided by an embodiment of the present disclosure.

Illustratively, by taking comparative calculation of the rotational speed and the power as an example, a process of searching for the power extreme point is described. Referring to FIG. 3, the searching process of the power extreme point may include following steps:

In step S201, a no-load rotational speed $w_0$ of a motor is acquired.

In this step, a rotational speed of the motor is acquired when there is no load on the propeller.

The no-load rotational speed is a speed when the motor rotates freely. At this time, a throttle value output by the controller is 0. That is, a rotational speed when no power is input to the motor, the controller does not control the motor to operate, the motor is only driven to rotate as the propeller is driven by water flow. When a user pushes a throttle to make the throttle deviate from zero-position, that is, the throttle value output by the controller is not 0, the regeneration charging function is turned off.

In step S202, a torque opposite to a water flow direction is increased, and the rotational speed of the propeller is reduced to obtain $w_1$.

In step S203, a regeneration charging power $p_1$ is detected and recorded.

A value of the regeneration charging power is equal to a product of a voltage and a current of a bus, that is, $U_{bus} \times I_{bus}$.

In step S204, a torque opposite to a water flow direction is increased again, and the rotational speed of the propeller is reduced to obtain $w_2$.

In step S205, a regeneration charging power $p_2$ is detected and recorded.

In step S206, it is determined whether an extreme point condition is satisfied.

That is, it is determined whether $p_1 > p_2$; specifically, it can be determined by determining whether $p_1 - p_2 > 0$ or whether $p_1 / p_2 > 1$.

If yes (Y), the power extreme point is found, and subsequent step S207 is performed.

If no (N), a value of $p_2$ is assigned to $p_1$, and the step S204 is returned to and performed until a preset condition in step S206 is satisfied.

S207, the rotational speed of the propeller is maintained at $w_1$ for regeneration charging.

Figure 4:
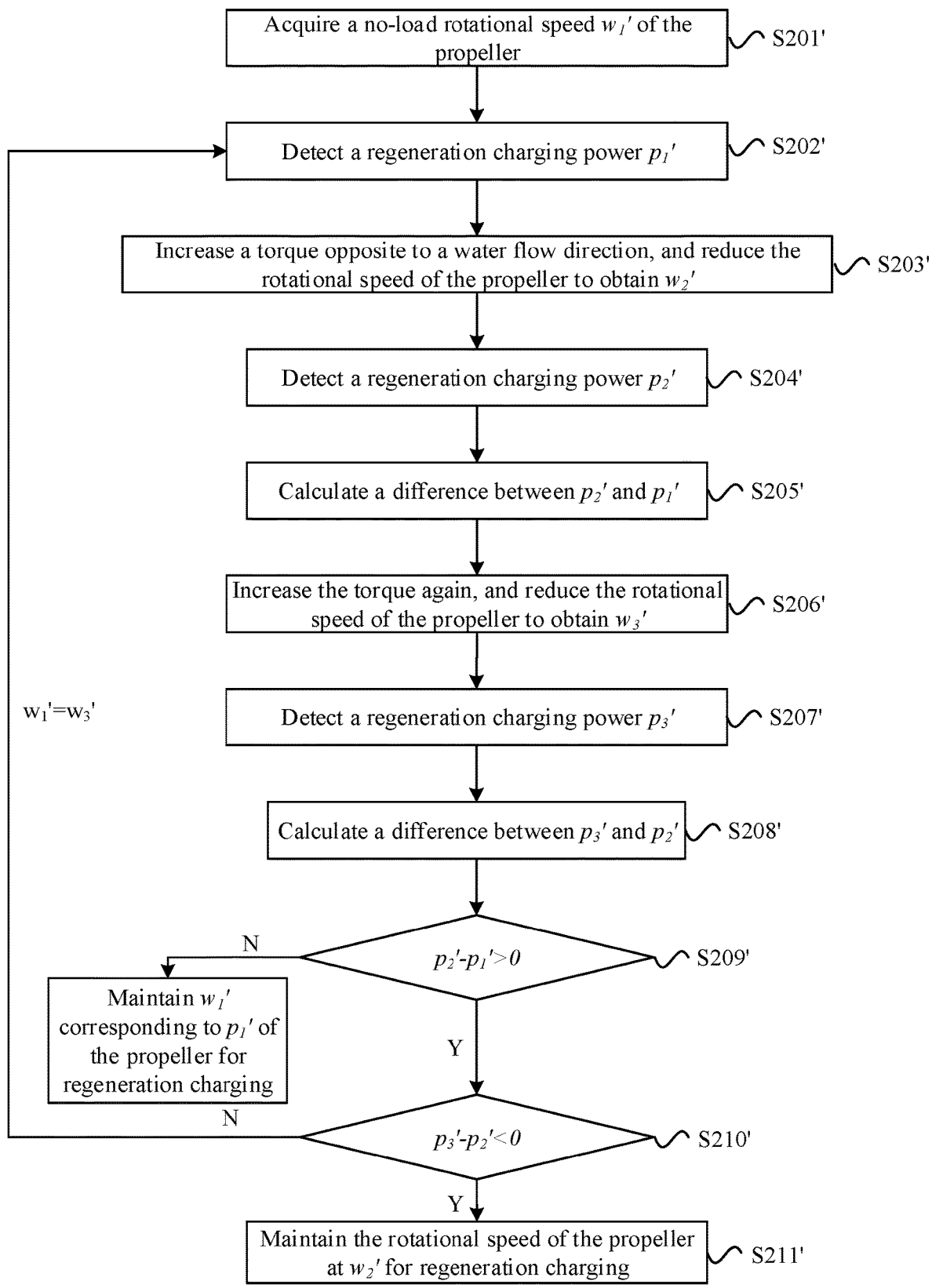
FIG. 4 is a schematic flowchart of another charging control method for a marine propulsion device provided by an embodiment of the present disclosure.

Illustratively, another searching process for the power extreme point is provided. Referring to FIG. 4, the searching process of the power extreme point may include following steps:

In step S201', a no-load rotational speed $w_1'$ of the propeller is acquired.

The no-load rotational speed is a speed when the motor rotates freely, that is, a rotational speed when the throttle is not pushed and no load is loaded, that is, a rotational speed when no power is input to the motor, and the motor is driven to rotate as the propeller is driven by water flow. In this step, the rotational speed w' of the motor is acquired when there is no load on the propeller.

In step S202', a regeneration charging power $p_1'$ is detected.

In step S203', a torque opposite to a water flow direction is increased, and the rotational speed of the propeller is reduced to obtain $w_2'$.

In step S204', a regeneration charging power $p_2'$ is detected.

In step S205', a difference between $p_2'$ and $p_1'$ is calculated.

In step S206', the torque is increased again, and the rotational speed of the propeller is reduced to obtain $w_3'$.

In step S207', a regeneration charging power $p_3'$ is detected.

In step S208', a difference between $p_3'$ and $p_2'$ is calculated.

In step S209', it is determined whether an extreme point condition is satisfied, that is, whether $p_2'>p_1'>0$ is satisfied.

If yes (Y), subsequent step S210' is performed; if no (N), $w_1'$ corresponding to $p_1'$ of the propeller is maintained for regeneration charging.

In step S210', it is determined whether an extreme point condition is satisfied, that is, whether $p_3'>p_3'>0$ is satisfied.

If yes (Y), subsequent step S211' is performed; if no (N), a value of $w_3'$ is assigned to $w_1'$, and step S202 is returned to and performed until a stable rotational speed is maintained for regeneration charging.

S211', the rotational speed of the propeller is maintained at $w_2'$ for regeneration charging.

In the above process, all calculating steps may be performed after detecting steps. For example, step S205' may be performed after step S207', which is not limited here.

The above searching steps for the power extreme point is realized based on a condition that the sailing speed will not suddenly change, that is, the searching speed of a highest efficiency point of the regeneration charging power is faster than the speed of a sudden change of the sailing speed. In the searching process, when variation of the sailing speed does not exceed a certain threshold, varied sailing speeds are regarded as the same sailing speed.

When a maximum motor power absorbing point (or the power extreme point) is found, the rotational speed is maintained to realize regeneration charging of the battery with optimal efficiency. Based on this, when the sailing speed varies, the above process is repeated to re-search for a new power extreme point.

Illustratively, it can be determined whether the sailing speed has varied by comparing a current motor torque and a torque at the power extreme point. Certainly, in other embodiments, when economic cost is not considered, it can be directly known whether the sailing speed has varied through sensors.

In some embodiments, the method may further include:
a corresponding relation between a theoretical rotational speed value and a theoretical torque value is determined based on the power extreme point;
based on the corresponding relation, when an actual rotational speed is equal to the theoretical rotational speed value, and a difference between an actual torque value and the theoretical torque value corresponding to the theoretical rotational speed value is greater than a preset difference, the power extreme point is re-determined.

To further ensure searching accuracy and adaptive adjustment of the power extreme point according to sailing speed variation, after finding the power extreme point, a reverse verification step can be added for a searching result, to determine whether a large deviation is presented; and when the large deviation is presented, adaptive adjustment or re-searching is performed.

Illustratively, at the maximum charging power, a corresponding relation between the rotational speed and the torque can be obtained by calculating based on motor characteristics and the absorbing power.

Based on theoretical calculation, under a working condition of the power extreme point, a certain rotational speed (w) corresponds to a certain torque (t), that is, $w_0$ corresponds to a $t_0$, $w_1$ corresponds to $t_1$, $w_2$ corresponds to $t_2$, . . . ; at a certain rotational speed $w_s$, when there is a large deviation between an actual torque value and a theoretical torque value $t_s$ corresponding to the rotational speed $w_s$, and a preset difference is exceeded, it may be regarded that deviation occurs in searching for the power extreme point due to apparent variation of the sailing speed or other erroneous circumstances. At this time, the power extreme point needs to be re-determined.

In the implementation of the method, that is, when a vessel is sailing on the sea, frequent searching process for the regeneration charging due to slight variation of the sailing speed may influence user's comfort and experience. Hence, a torque variation threshold (i.e., a preset difference) may be set, and it is determined whether a torque variation is within a preset range (that is, a range defined by the preset difference) in advance, and when the difference between the actual torque value and the theoretical torque value exceeds the threshold, a searching mode for the highest efficiency point of regeneration charging is re-entered to search for the power extreme point.

In some embodiments, the preset difference may be smaller than or equal to 50% of the theoretical torque value.

In the present embodiment, the preset difference may be smaller than or equal to 50% of the theoretical torque value. That is, when the difference between the actual torque value and the theoretical torque value is above 50% of the theoretical torque value, searching steps are re-triggered. For some certain marine propulsion devices with large power, it can be set according to accuracy requirement.

In such way, it is beneficial to ensuring user's comfort and experience during sailing process of the vessel.

On the basis of the above implementations, the torque can be adjusted based on a relative relation between the actual torque value and the theoretical torque value, so as to re-determine the power extreme point.

In some embodiments, the power extreme point is re-determined includes:
when the actual torque value is greater than the theoretical torque value, the rotational speed is gradually increased and the power extreme point is re-searched;
when the actual torque value is smaller than the theoretical torque value, the rotational speed is gradually reduced and the power extreme point is re-searched.

When the actual torque value is greater than the theoretical torque value, the rotational speed is gradually increased by directly or indirectly adjusting a current or the torque of the motor; the regeneration charging power corresponding to the increased rotational speed is acquired; the previously and subsequently acquired regeneration charging powers are compared; when a previous regeneration charging power is greater than a subsequent regeneration charging power, the previous regeneration charging power is determined as the power extreme point; when the previous regeneration charging power is not greater than the subsequent regeneration charging power, the subsequent regeneration charging power is assigned as a new previous regeneration charging power to repeat a searching process.

When the actual torque value is smaller than the theoretical torque value, the rotational speed is gradually reduced by directly or indirectly adjusting a current or the torque of the motor; the regeneration charging power corresponding to the increased rotational speed is acquired; the previously and subsequently acquired regeneration charging powers are compared; when a previous regeneration charging power is greater than a subsequent regeneration charging power, the previous regeneration charging power is determined as the power extreme point; when the previous regeneration charging power is not greater than the subsequent regeneration charging power, the subsequent regeneration charging power is assigned as a new previous regeneration charging power to repeat a searching process.

Specifically, when the actual torque value is greater than the theoretical torque value, a torque opposite to a water flow direction is reduced, so that a preset rotational speed variation is correspondingly added on an original rotational speed, and the increased rotational speed is assigned as an initial rotational speed, to start to re-search for the power extreme point; when the actual torque value is smaller than the theoretical torque value, a torque opposite to a water flow direction is gradually increased, so that a preset rotational speed variation is correspondingly subtracted from an original rotational speed, and the reduced rotational speed is assigned as an initial rotational speed, to start to re-search for the power extreme point.

In such way, searching speed for the power extreme point can be improved, and searching validity can be improved.

Figure 5:
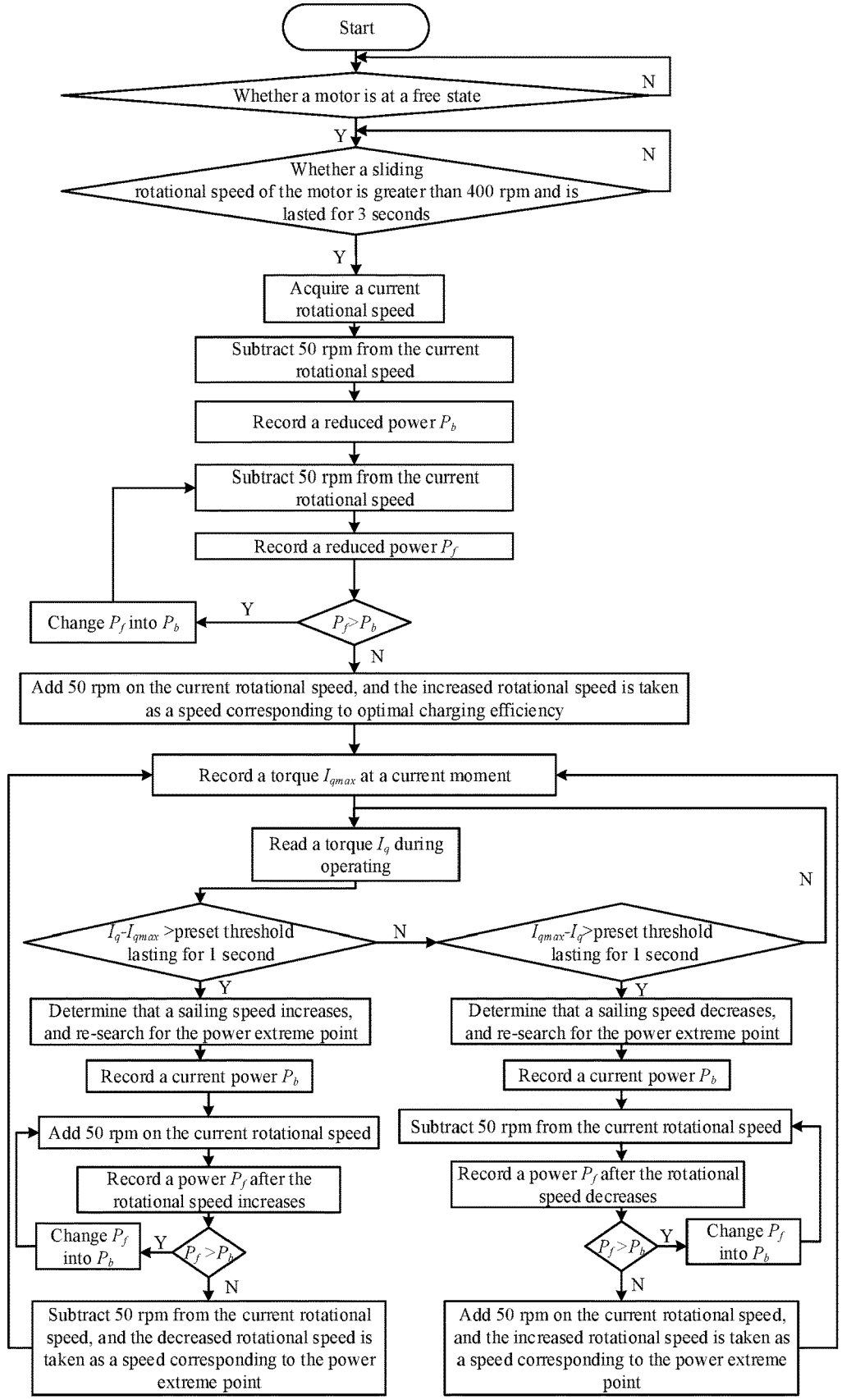
FIG. 5 is a schematic flowchart of another charging control method for a marine propulsion device provided by an embodiment of the present disclosure.

Illustratively, by taking that the preset rotational speed variation is 50 rpm as an example, FIG. 5 shows a charging control method for a marine propulsion device of a searching process for the power extreme point when a sailing speed fluctuation exceeds a preset range. Illustratively, as shown in FIG. 5, the method may include following steps.

Start.

It is determined whether a motor is at a free state.

If no (N), return to the determining step; if yes (Y), continue to perform subsequent steps.

It is determined whether a sliding rotational speed of the motor is greater than 400 rpm and is lasted for 3 seconds.

If no (N), return to the determining step; if yes (Y), continue to perform subsequent steps.

A current rotational speed is acquired.

50 rpm is subtracted from the current rotational speed.

A reduced power $P_b$ is recorded.

50 rpm is subtracted from the current rotational speed again.

A reduced power $P_f$ is recorded.

By now, power $P_b$ and power $P_f$ are regeneration charging power after a first time of deceleration and regeneration charging power after a second time of deceleration respectively. Based on that, determining step is performed.

It is determined whether $P_f > P_b$.

That is, it is determined whether a corresponding regeneration charging power after deceleration is greater than a corresponding regeneration charging power before deceleration. If yes (Y), it is indicated that the regeneration charging power is still increasing, and the corresponding regeneration charging power after the deceleration is taken as a new previous regeneration charging power, and deceleration is continued for further comparison.

Until a determination result is "no" (N), it is indicated that the regeneration charging power is not further increasing, and the power extreme point is found.

At this time, 50 rpm is added on the current rotational speed, and the increased rotational speed is taken as a speed corresponding to optimal charging efficiency.

Subsequently, based on monitoring on the torque, further adjustment on the rotational speed is realized when there is a large fluctuation of the sailing speed, that is, following steps are performed.

A torque $I_{qmax}$ at a current moment is recorded.

A torque $I_q$ during operating is read.

It is determined whether $I_q - I_{qmax}$>preset threshold lasting for 1 second.

That is, it is determined whether the torque fluctuates upward excessively. If yes (Y), subsequent re-searching and adjusting steps are performed; if no (N), it is determined whether the torque fluctuates downward excessively, that is:

it is determined whether $I_{qmax} - I_q$>preset threshold lasting for 1 second.

If yes, it is indicated that the torque fluctuates downward excessively, and subsequent re-searching and adjusting steps are performed; if no (N), real-time monitoring step on the torque is returned to, that is, return to perform reading the torque $I_q$ during operating.

If it is satisfied that $I_q - I_{qmax}$>preset threshold lasting for 1 second, following steps are performed.

It is determined that the sailing speed is increased, and the power extreme point is re-searched.

A current power $P_b$ is recorded.

50 rpm is added on the current rotational speed.

An increased power $P_f$ is recorded.

At this time, power $P_b$ and power $P_f$ are regeneration charging power before and after acceleration respectively. Based on that, determining step is performed.

It is determined whether $P_f > P_b$.

That is, it is determined whether a corresponding regeneration charging power after acceleration is greater than a corresponding regeneration charging power before acceleration. If yes (Y), it is indicated that the regeneration charging power is still increasing, and the corresponding regeneration charging power after the acceleration is taken as a new previous regeneration charging power, and acceleration is continued for further comparison.

Until a determination result is "no" (N), it is indicated that the regeneration charging power is not further increasing, and the power extreme point is found.

At this time, the current rotational speed is subtracted by 50 rpm, and the reduced rotational speed is taken as a speed corresponding to the power extreme point, and return to perform recording the torque $I_{qmax}$ at the current moment.

If it is satisfied that $I_{qmax} - I_q$>preset threshold lasting for 1 second, following steps are performed.

It is determined that the sailing speed is decrease, and the power extreme point is re-searched.

A current power $P_b$ is recorded.

50 rpm is subtracted from the current rotational speed.

A reduced power $P_f$ is recorded.

At this time, power $P_b$ and power $P_f$ are regeneration charging power before and after deceleration respectively. Based on that, determining step is performed.

It is determined whether $P_f > P_b$.

That is, it is determined whether a corresponding regeneration charging power after deceleration is greater than a corresponding regeneration charging power before deceleration. If yes (Y), it is indicated that the regeneration charging power is still increasing, and the corresponding regeneration charging power after the deceleration is taken as a new previous regeneration charging power, and deceleration is continued for further comparison.

Until a determination result is "no" (N), it is indicated that the regeneration charging power is not further increasing, and the power extreme point is found.

At this time, the current rotational speed is added by 50 rpm, and the increased rotational speed is taken as a speed corresponding to the power extreme point, and return to perform recording the torque $I_{qmax}$ at the current moment.

By now, searching process for the power extreme point is completed, and re-searching process for the power extreme point when the sailing speed fluctuation exceeds a preset range is completed.

A value of the designed threshold can be determined based on the preset range of the sailing speed fluctuation, which is not limited here.

In the above embodiments, on the basis of FIG. 1, step S130 may include:

it is determined whether the rotational speed of the motor is greater than a preset value, and if yes, a switch device connected to a battery circuit is turned on to start regeneration charging for the battery.

This step is a pre-determining step, and when it is determined as affirmative, subsequent steps are performed.

Illustratively, the preset value may be 400 rpm or may be selected as other values, which is not limited here.

On the basis of the above embodiments, embodiments of the present disclosure further provide a charging control system for a marine propulsion device. The system may be configured to perform steps of any one of the above method, to realize corresponding beneficial effects. Same content can be referred to from the above description, and will not be repeated in the following.

Figure 6:
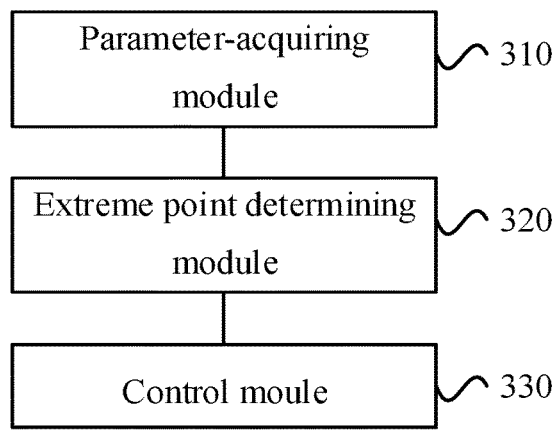
FIG. 6 is a schematic structural diagram of a charging control system for a marine propulsion device provided by an embodiment of the present disclosure.

Illustratively, FIG. 6 is a schematic structural diagram of a charging control system for a marine propulsion device provided by an embodiment of the present disclosure. Referring to FIG. 6, the system includes: a parameter-acquiring module 310, configured to acquire a rotational speed and a regeneration charging power of a motor during a sailing process of a vessel; an extreme point determining module 320, configured to adjust the rotational speed to obtain the regeneration charging power corresponding to the adjusted rotational speed, and search for the power extreme point of the regeneration charging power relative to the rotational speed during an adjusting process based on a regeneration charging power varying process; a control module 330, configured to maintain the rotational speed corresponding to the power extreme point to realize regeneration charging of a battery. It shall be understood that the control module 330 may be a virtual module in a controller, and the control module 330 may be configured as an executable program in the controller.

The rotational speed of the motor is exactly the same as a rotational speed of a propeller; or the rotational speed of the motor and the rotational speed of the propeller change linearly and are related by a proportional coefficient. Therefore, the rotational speed of the propeller can be replaced with the rotational speed of the motor to represent relations between the rotational speed and the regeneration charging power.

Based on this, in the system, a searching module for a highest efficiency point of the regeneration charging power (i.e., the extreme point determining module 320) acquires the rotational speed and the regeneration charging power based on the parameter acquiring module 310 to search for the power extreme point, and obtains an extreme point of a maximum absorbing power of the motor; the control module 330 determines a corresponding rotational speed and an associated torque based on the power extreme point, and maintains the rotational speed to realize regeneration charging of a battery, so as to maintain the battery at maximum efficiency for charging; various sensors do not need to be set to acquire related parameters, so that the manufacturing cost is reduced and the productization is easy.

In some embodiments, the control module 330 can further realize adjustment to the rotational speed. Under a certain sailing speed, a given rotational speed is varied through a speed loop, and when the given rotational speed is equal to a feedback speed, power is detected and is transmitted to the extreme point determining module 320. The extreme point determining module 320 computes and compares powers corresponding to at least three continuous rotational speeds in the rotational speed adjustment process, to realize searching for the power extreme point.

In some embodiments, adjustment on the rotational speed can be realized based on adjustment on torque.

Figure 7:
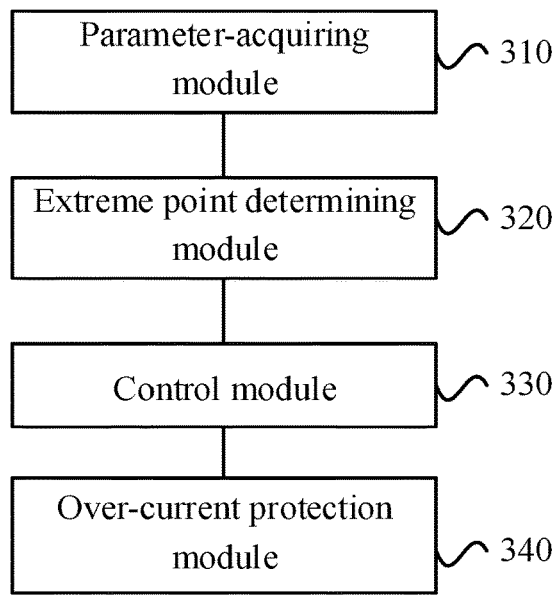
FIG. 7 is a schematic structural diagram of another charging control system for a marine propulsion device provided by an embodiment of the present disclosure.

In some embodiments, FIG. 7 is a schematic structural diagram of another charging control system for a marine propulsion device provided by an embodiment of the present disclosure. On the basis of FIG. 6, referring to FIG. 7, the system further includes: an over-current protector 340, configured to release at least part of energy during a regeneration charging process, so as to restrict a bus current.

When a motor is dragged or decelerated, energy in the motor will impact a voltage or a current in a driver bus, and even leads to lasting high voltage, and when the current is higher than a current tolerance of a driving circuit, the driving circuit will be damaged. By setting the over-current protector 340, the battery and other electronic devices can be prevented from being burned to damage resulted by excessive current exceeding a current threshold during a regeneration charging process when the sailing speed is high, which is beneficial to ensuring safety of the regeneration charging process.

Figure 8:
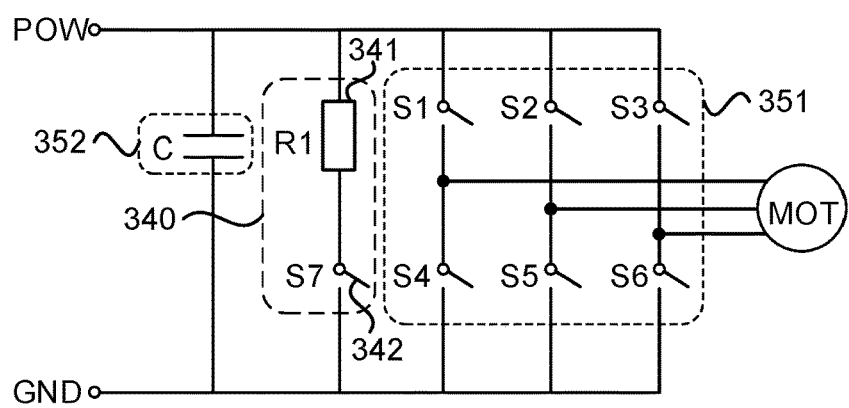
FIG. 8 is a schematic structural diagram of an over-current protector provided by an embodiment of the present disclosure.

In some embodiments, FIG. 8 is a schematic structural diagram of an over-current protector provided by an embodiment of the present disclosure. On the basis of FIG. 7, referring to FIG. 8, the over-current protector 340 includes a current limiting device 342 (shown as S7) and a resistor 341 (shown as R1); an end of the current limiting device 342 is connected to an end of a motor driving circuit 351 and an end of a capacitor 352, and is grounded; another end of the current limiting device 342 is connected to a first end of the resistor 341, and a second end of the resistor 341 is connected to another end of the motor driving circuit 351 and another end of the capacitor 352, and is connected to a power end.

The capacitor 352 is shown as C; the motor driving circuit 351 includes a three-phase control circuit, and each single-phase control circuit includes two switch devices, shown as S1, S2, S3, S4, S5 and S6 in FIG. 8.

When the motor is operating in a high-speed dragging state or in a sudden deceleration state, a bus current is recoiled and becomes higher; a current threshold can be set, and when an actual current is higher than the current threshold, a battery circuit is turned off (not shown), to prevent the battery from being charged; at the same time, a CPU (Central Processing Unit) can control the switch device (including S1-S6) to close, and control the current limiting device 342 to close, and the resistor R1 and the current limiting device S7 form a circuit to release part of the energy, so as to control the bust current to realize circuit protection.

In some embodiments, both the switch device and the current limiting device may include a MOS (Metal Oxide Semiconductor) transistor, and an input end and an output end of the MOS transistor in the current limiting device is connected to the resistor and is grounded respectively. In other embodiments, the switch device here can also choose IGBT (Insulated Gate Bipolar Transistor).

The over-current protector 340 including the MOS transistor and the resistor R1 is set. When the motor is operating in a high-speed dragging state or a sudden deceleration state, the bus current is recoiled and becomes higher; a current threshold can be set, and when an actual current is higher than the current threshold, the battery circuit is closed to prevent the battery from being charged; at the same time, the CPU controls the current limiting device 342 to close, and the resistor R1 and the current limiting device 342 form a circuit to release the part of energy, so as to control the bus current. Further, when the current limiting device 342 adopts the MOS transistor, the current limiting device 342 can be continuously closed to continuously release energy; or the current limiting device 342 can be opened intermittently, and a duty ratio of the MOS transistor can be adjusted, to adjust effective current after being released, so as to control release circuit energy, to realize a purpose of limiting the bus current.

On the basis of the above embodiments, a value of the regeneration charging power may be equal to a product of the bus voltage and the bus current, that is, $U_{bus} \times I_{bus}$; in other embodiments, power $P'''=3/2(I_d U_d+I_q U_q)$ output by a controller can also be detected; $P'''=3/2(I_\alpha U_\alpha+I_\beta U_\beta)$ is further calculated to further save cost.

Figure 9:
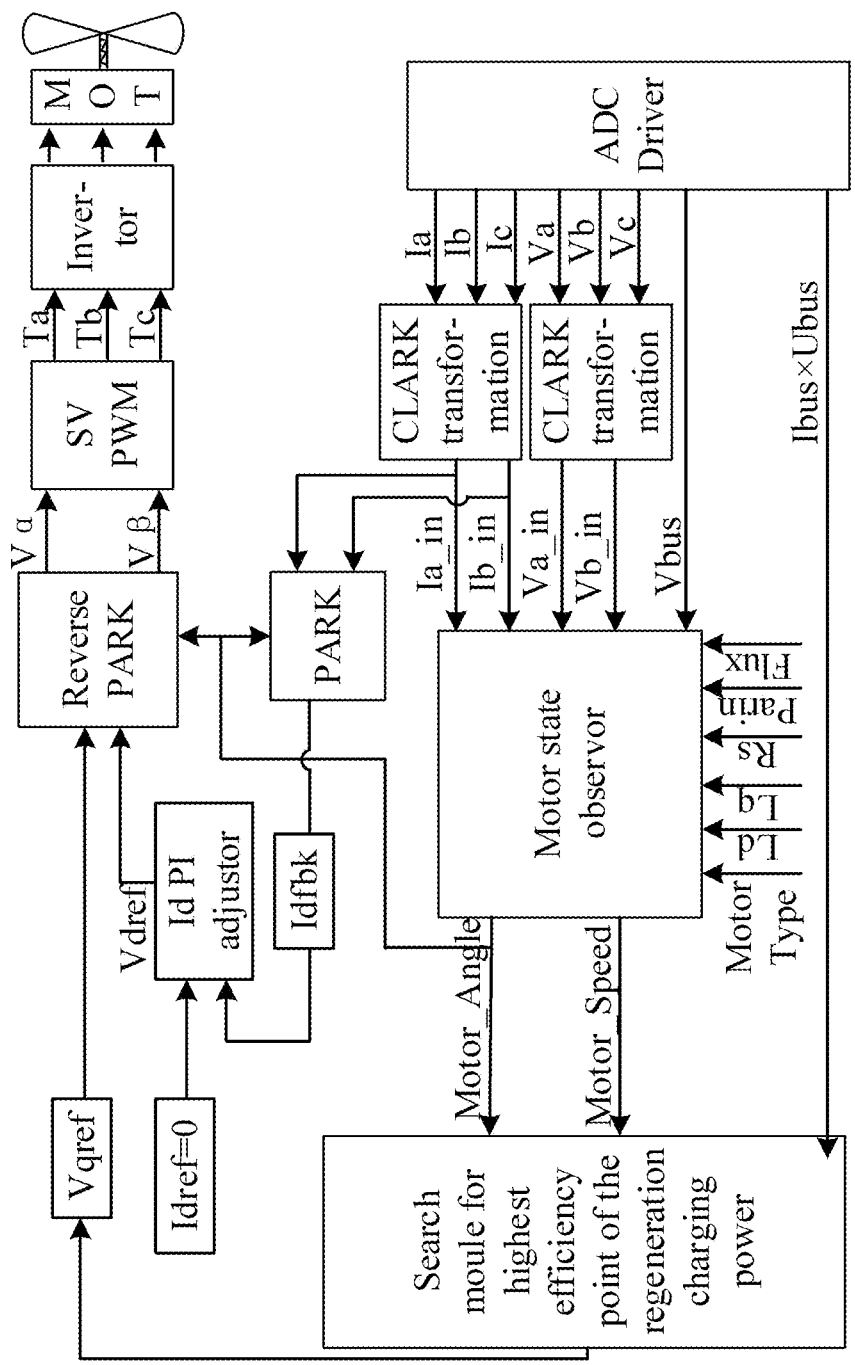
FIG. 9 is a block diagram of control principles of regeneration charging provided by an embodiment of the present disclosure.

On the basis of the above embodiments, illustratively, FIG. 9 is a block diagram of control principles of regeneration charging provided by an embodiment of the present disclosure. Referring to FIG. 9, a q-axis current is adjusted in an open loop, and a searching module for a highest efficiency point (i.e. an efficiency extreme point) of the regeneration charging power (hereinafter referred to as the "searching module") directly outputs a $V_q$ value, and a given value of a magnetic linkage current Id is set to 0 (i.e. $I_{dref}=0$). The magnetic linkage current Id can also be set to any given value according to actual requirement. Based on this, d-axis current is adjusted in a PI loop, and a given value $V_d$ (i.e. Vdref) is output. Then, the given value $V_d$ and a torque voltage $V_{qref}$ are performed with reverse PARK transformation to output $V_\alpha$ and $V_\beta$, and then the motor (MOT) is controlled to rotate after subsequent transformation.

Figure 10:
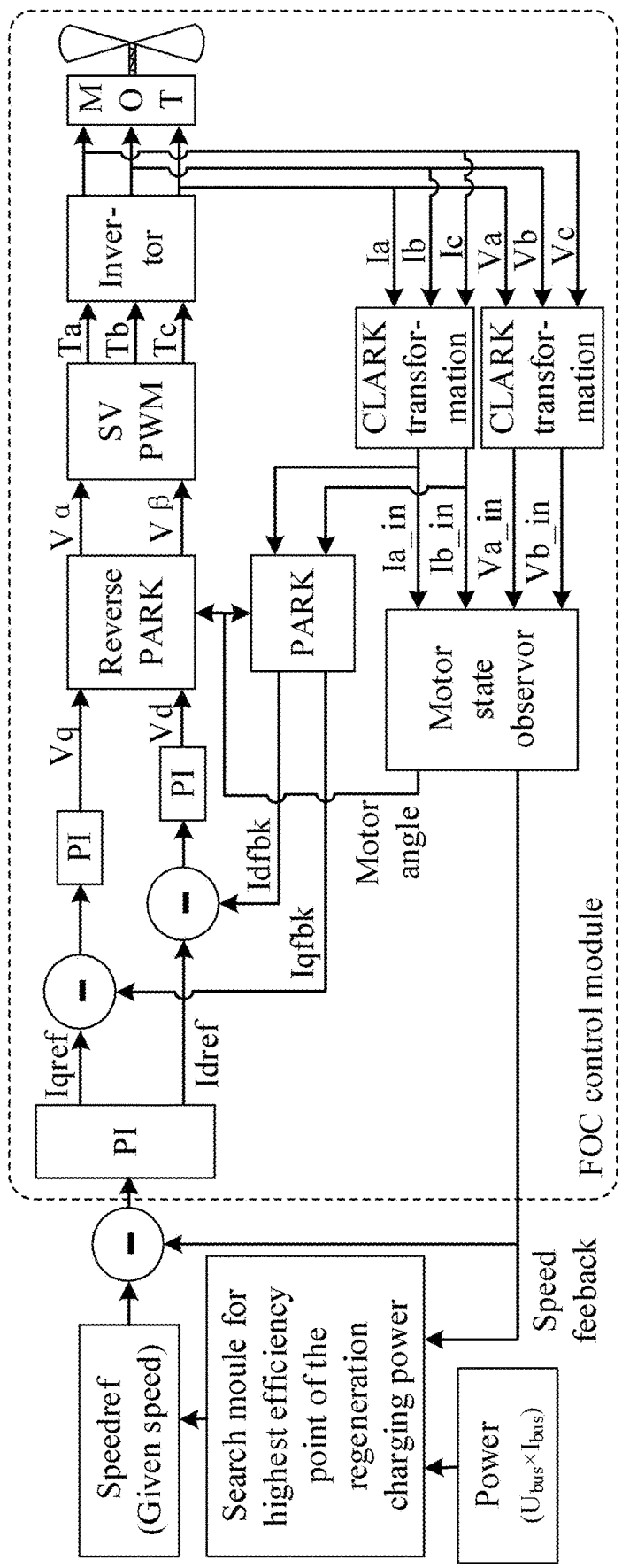
FIG. 10 is another block diagram of control principles of regeneration charging provided by an embodiment of the present disclosure.

In the control principle shown in FIG. 9, the search module directly feeds back the $V_q$ value, or it can also adopt an indirect search manner to feed back a speed first and then acquire the $V_q$ value, as shown in FIG. 10, so that a control speed can be more stable.

Illustratively, FIG. 10 is another block diagram of control principles of regeneration charging provided by an embodiment of the present disclosure. Referring to FIG. 10, detected stator three-phase currents $I_a$, $I_b$ and $I_c$ and three-phase voltages $V_a$, $V_b$ and $V_c$, after Clark transformation, are processed as input parameters of a motor state observer, and motor angle and speed feedback parameters are output; a deviation between a feedback of power and speed, as input parameters of the search module for the highest efficiency point of regeneration charging power, and a given speed is calculated, and is adjusted by a speed loop PI controller to obtain a given value of a current torque component and a given value of a current excitation component.

The detected stator three-phase currents $I_a$, $I_b$ and $I_c$ are performed with Clark transformation and Park transformation to obtain a current detection feedback signal, and a feedback value of the current torque component and a feedback value of the current excitation component are compared with the given value Id of the current torque component and the given value $I_q$ of the current excitation component, respectively. Alternating current voltage value V q and direct current voltage value $V_d$, after being output through the current loop PI controller, are performed with reverse PARK coordinate transformation together with an angular value of the motor output by the current state observer, to generate voltage values $V_\alpha$ and $V_\beta$ in an α-β coordinate system. After the voltage values $V_\alpha$ and $V_\beta$ pass through a space vector pulse width modulation (SVPWM) module, torque components $T_a$, $T_b$ and $T_c$ are synthesized and taken as driving control signals of a three-phase inverter to control a propelling motor.

Embodiments of the present disclosure further provide a computer storage medium, where the computer storage medium can store a program, and when the program is executed, part of or all steps in respective implementations of the charging control method for the marine propulsion device provided in the embodiments of the present disclosure can be implemented, to realize corresponding technical effects, which will not be repeated here.

On the basis of the above embodiments, embodiments of the present disclosure further provide a marine propulsion device. The marine propulsion device includes a propeller, a motor, a controller, where the controller is configured to execute any one of the above charging control method for the marine propulsion device, the marine propulsion device may include or is externally connected with an energy accumulator (usually a battery), so that the marine propulsion device can realize any one of the above charging control method for the marine propulsion device. In some embodiments, the propeller may be a foldable propeller, the adopted foldable propeller may be unfolded during charging or operating; and the propeller is folded when the battery does not need to be charged, so as to reduce resistance of the vessel sailing in water.

As an embodiment, the marine propulsion device includes a water-press plate, regeneration charging efficiency of the marine propulsion device can be improved by setting the water-press plate.

As an embodiment, the marine propulsion device further includes a display apparatus, where the display apparatus displays the regeneration charging power, or a charging current, or a required duration that the battery can be fully charged, so as to provide well interaction functions. At the same time, the marine propulsion device may further include other power apparatuses, where the other power apparatuses can operate with help of fuels such as diesel and gasoline, that is, the marine propulsion device may be motor-driven or hybrid-driven. In addition, the marine propulsion device can also be powered by other means, such as wind energy and tidal energy, etc.

It should be noted that relational terms such as "first" and "second" are only used to distinguish one entity or operation from another entity or operation, and do not necessarily require or imply that there is any such actual relationship or order between these entities or operations. Moreover, the terms "include", "comprise" or any other variation thereof are intended to cover non-exclusive inclusion, so that a process, method, object or device including a series of elements includes not only those elements, but also other elements not explicitly listed or elements inherent to such process, method, object or device. Without further restrictions, an element defined by a phrase "including a" does not exclude the existence of other identical elements in the process, method, object or device including the element.

Above-described content is only specific embodiments of the present disclosure, so that those skilled in the art can understand or realize the present disclosure. Various modifications to these embodiments will be obvious to those skilled in the art, and general principles defined herein can be implemented in other embodiments without departing from the spirit or scope of the present disclosure. Therefore, the present disclosure is not to be limited to the embodiments shown herein, but is to coincide with a widest scope consistent with principles and novel features disclosed herein.

INDUSTRIAL APPLICABILITY

According to the charging control method for the marine propulsion device provided by the present disclosure, according to an associated relation between the rotational speed and the regeneration charging power of the motor, when a sailing speed fluctuates within a preset range, the power extreme point of the regeneration charging power relative to the rotational speed is determined, and the rotational speed is maintained for sailing, so that the battery is charged at the power extreme point, thus achieving high charging efficiency without setting a separate sensor to detect the rotational speed of the propeller, which is beneficial to simplifying structure and reducing cost; in addition, a control strategy is also simplified, thereby improving stability of a control process, which has a high industrial applicability.

What is claimed is:

1. A charging control method for a marine propulsion device, comprising:
   acquiring a regeneration charging power and a rotational speed of a motor of the marine propulsion device during a sailing process of a vessel;
   adjusting the rotational speed one or more times, and after each time of rotational speed adjustment, acquiring a regeneration charging power corresponding to an adjusted rotational speed, and searching for a power extreme point based on a regeneration charging power varying process; and
   maintaining a rotational speed corresponding to the power extreme point to realize regeneration charging of a battery coupled to the marine propulsion device.

2. The method according to claim 1, wherein acquiring the rotational speed of the motor of the marine propulsion device comprises:
   acquiring a regeneration electromotive force and/or an angular speed of the motor; and
   determining the rotational speed of the motor based on a conversion relation between the regeneration electromotive force and the rotational speed, and/or a conversion relation between the angular speed and the rotational speed.

3. The method according to claim 1, wherein adjusting the rotational speed one or more times, and after each time of rotational speed adjustment, acquiring the regeneration charging power corresponding to the adjusted rotational speed, and searching for the power extreme point based on the regeneration charging power varying process comprises:
   one or more times of searching process, wherein for each time of the searching process:
   acquiring an initial rotational speed and a regeneration charging power corresponding to the initial rotational speed, wherein in a first time of the searching process, the initial rotational speed is the acquired rotational speed, the regeneration charging power corresponding to the initial rotational speed is the acquired regeneration charging power;
   reducing the initial rotational speed by directly or indirectly adjusting a current or a torque of the motor, and acquiring a regeneration charging power corresponding to a reduced rotational speed;
   comparing the regeneration charging power corresponding to the initial rotational speed and the regeneration charging power corresponding to the reduced rotational speed;
   when the regeneration charging power corresponding to the initial rotational speed is greater than the regeneration charging power corresponding to the reduced rotational speed, determining the regeneration charging power corresponding to the initial rotational speed as the power extreme point;
   when the regeneration charging power corresponding to the initial rotational speed is not greater than the regeneration charging power corresponding to the reduced rotational speed, assigning the reduced rotational speed as an initial rotational speed in a next time of the searching process, and assigning the regeneration charging power corresponding to the reduced rotational speed as a regeneration charging power corresponding to the initial rotational speed in the next time of the searching process.

4. The method according to claim 1, wherein adjusting the rotational speed one or more times, and after each time of rotational speed adjustment, acquiring the regeneration charging power corresponding to the adjusted rotational speed, and searching for the power extreme point based on the regeneration charging power varying process comprises:
   one or more times of searching process, wherein for each time of the searching process:
   acquiring an initial rotational speed and a regeneration charging power corresponding to the initial rotational speed, wherein in a first time of the searching process, the initial rotational speed is the acquired rotational speed, the regeneration charging power corresponding to the initial rotational speed is the acquired regeneration charging power;
   reducing the initial rotational speed by directly or indirectly adjusting a current or a torque of the motor, and acquiring a regeneration charging power corresponding to a first-time-reduced rotational speed;
   determining a first difference by subtracting the regeneration charging power corresponding to the initial rotational speed from the regeneration charging power corresponding to the first-time-reduced rotational speed;
   reducing the first-time-reduced rotational speed by directly or indirectly adjusting a current or a torque of the motor, and acquiring a regeneration charging power corresponding to a second-time-reduced rotational speed;
   determining a second difference by subtracting the regeneration charging power corresponding to the first-time-reduced rotational speed from the regeneration charging power corresponding to the second-time-reduced rotational speed;
   when the first difference is not greater than 0, determining the regeneration charging power corresponding to the initial rotational speed as the power extreme point;
   when the first difference is greater than 0, and the second difference is smaller than 0, determining the regeneration charging power corresponding to the first-time-reduced rotational speed as the power extreme point;
   when the first difference is greater than 0, and the second difference is not smaller than 0, assigning the second-time-reduced rotational speed as an initial rotational speed in a next time of the searching process, and assigning the regeneration charging power corresponding to the second-time-reduced rotational speed as a regeneration charging power corresponding to the initial rotational speed in the next time of the searching process.

5. The method according to claim 3, wherein reducing the initial rotational speed comprises:
   subtracting a preset rotational speed variation from the initial rotational speed.

6. The method according to claim 4, wherein reducing the initial rotational speed comprises:

subtracting a preset rotational speed variation from the initial rotational speed.

7. The method according to claim 1, wherein before maintaining the rotational speed corresponding to the power extreme point to realize regeneration charging of the battery coupled to the marine propulsion device, the method comprises:
determining whether the rotational speed is greater than a preset value, and when the rotational speed is greater than the preset value, starting a regeneration charging function;
or,
determining whether a throttle value output by a controller of the marine propulsion device is 0, and when the throttle value is 0, starting a regeneration charging function.

8. The method according to claim 1, further comprising:
when detecting that at least one of a sailing speed variation, a rotational speed variation or a torque variation exceeds a theoretical threshold, re-determining the power extreme point.

9. The method according to claim 8, wherein re-determining the power extreme point when the torque variation exceeds the theoretical threshold comprises:
determining a corresponding relation between a theoretical rotational speed value and a theoretical torque value based on the power extreme point; and
based on the corresponding relation, when an actual rotational speed is equal to the theoretical rotational speed value, and a difference between an actual torque value and the theoretical torque value corresponding to the theoretical rotational speed value is greater than a preset difference, re-determining the power extreme point.

10. The method according to claim 9, wherein re-determining the power extreme point comprises:
when the actual torque value is greater than the theoretical torque value, gradually increasing the rotational speed and re-searching the power extreme point; and
when the actual torque value is smaller than the theoretical torque value, gradually reducing the rotational speed and re-searching the power extreme point.

11. The method according to claim 10, wherein gradually increasing the rotational speed and re-searching the power extreme point comprises:
one or more times of searching process, wherein for each time of the searching process:
acquiring an initial rotational speed and a regeneration charging power corresponding to the initial rotational speed, wherein for a first time of the searching process, the initial rotational speed is a rotational speed corresponding to a current power extreme point, and the regeneration charging power corresponding to the initial rotational speed is the current power extreme point;
increasing the initial rotational speed according to a preset rotational speed variation by directly or indirectly adjusting a current or a torque of the motor, and acquiring a regeneration charging power corresponding to an increased rotational speed;
comparing the regeneration charging power corresponding to the initial rotational speed and the regeneration charging power corresponding to the increased rotational speed;
when the regeneration charging power corresponding to the initial rotational speed is greater than the regeneration charging power corresponding to the increased rotational speed, determining the regeneration charging power corresponding to the initial rotational speed as the power extreme point;
when the regeneration charging power corresponding to the initial rotational speed is not greater than the regeneration charging power corresponding to the increased rotational speed, assigning the increased rotational speed as an initial rotational speed in a next time of the searching process, and assigning the regeneration charging power corresponding to the increased rotational speed as a regeneration charging power corresponding to the initial rotational speed in the next time of the searching process;
wherein gradually reducing the rotational speed and re-searching the power extreme point comprises:
one or more times of searching process, wherein for each time of the searching process:
acquiring an initial rotational speed and a regeneration charging power corresponding to the initial rotational speed, wherein for a first time of the searching process, the initial rotational speed is a rotational speed corresponding to a current power extreme point, and the regeneration charging power corresponding to the initial rotational speed is the current power extreme point;
reducing the initial rotational speed according to a preset rotational speed variation by directly or indirectly adjusting a current or a torque of the motor, and acquiring a regeneration charging power corresponding to a reduced rotational speed;
comparing the regeneration charging power corresponding to the initial rotational speed and the regeneration charging power corresponding to the reduced rotational speed;
when the regeneration charging power corresponding to the initial rotational speed is greater than the regeneration charging power corresponding to the reduced rotational speed, determining the regeneration charging power corresponding to the initial rotational speed as the power extreme point; and
when the regeneration charging power corresponding to the initial rotational speed is not greater than the regeneration charging power corresponding to the reduced rotational speed, assigning the reduced rotational speed as an initial rotational speed in a next time of the searching process, and assigning the regeneration charging power corresponding to the reduced rotational speed as a regeneration charging power corresponding to the initial rotational speed in the next time of the searching process.

12. The method according to claim 9, wherein the preset difference is smaller than or equal to 50% of the theoretical torque value.

13. A charging control system for a marine propulsion device, comprising a propeller, a motor, a controller, wherein the controller is configured to:
acquire a regeneration charging power and a rotational speed of the motor during a sailing process of a vessel;
adjust the rotational speed one or more times, acquire a regeneration charging power corresponding to an adjusted rotational speed, and search for a power extreme point; and
maintain a rotational speed corresponding to the power extreme point to realize regeneration charging of a battery coupled to the charging control system for the marine propulsion device.

14. The system according to claim 13, further comprising:
an over-current protector, configured to release at least part of energy during a regeneration charging process, so as to restrict a bus current.

15. The system according to claim 14, wherein the over-current protector comprises a current limiting device and a resistor;
an end of the current limiting device is connected to an end of a motor driving circuit and an end of a capacitor, and is grounded;
another end of the current limiting device is connected to an end of the resistor, and another end of the resistor is connected to another end of the motor driving circuit and another end of the capacitor and is connected to a power end.

16. A marine propulsion device, comprising a propeller, a motor and a controller, wherein the controller performs the method according to claim 1, and the marine propulsion device comprises or is externally connected with an energy accumulator.

17. The marine propulsion device according to claim 16, wherein the propeller comprises a foldable propeller.

* * * * *